United States Patent [19]

Rovira

[11] 4,451,372
[45] May 29, 1984

[54] METHOD AND INSTALLATION FOR PURIFYING CONTAMINATING WATER

[75] Inventor: Felipe P. Rovira, Soria, Spain

[73] Assignee: D. Felipe Pineda S.A., Soria, Spain

[21] Appl. No.: 304,995

[22] Filed: Sep. 23, 1981

[30] Foreign Application Priority Data

Sep. 23, 1980 [ES] Spain .................................. 495.266

[51] Int. Cl.³ .......................... C02F 3/30; C05F 7/00
[52] U.S. Cl. .................................. 210/603; 210/605; 210/617; 210/630; 210/205; 71/8
[58] Field of Search .................... 71/9, 10, 6, 7, 8, 14; 210/150, 151, 205, 603, 605, 613, 617, 616, 620, 630; 435/287, 313, 813, 819, 166, 167

[56] References Cited

U.S. PATENT DOCUMENTS

| 3,241,943 | 3/1966 | Bystorm | 71/9 |
| 3,994,802 | 11/1976 | Casey et al. | 210/605 |
| 4,135,908 | 1/1979 | Widmer | 71/9 |
| 4,139,456 | 2/1979 | Yabuuchi et al. | 210/617 |
| 4,184,269 | 1/1980 | Kneer | 71/9 |
| 4,198,211 | 4/1980 | Shattock | 210/603 |
| 4,323,367 | 4/1982 | Ghosh | 435/167 |
| 4,350,588 | 9/1982 | Tsubota | 210/603 |

FOREIGN PATENT DOCUMENTS

| 3024813 | 7/1980 | Fed. Rep. of Germany | 210/605 |
| 56-49639 | 11/1981 | Japan | 210/150 |

Primary Examiner—Charles N. Hart
Assistant Examiner—John W. Czaja
Attorney, Agent, or Firm—Ralf H. Siegemund

[57] ABSTRACT

The specification discloses a method and installation for purifying waste. A tank (1) is fed with the waste and with a biological filter substrate, both of which are fermented within the tank. Pipes and ducts (17, 28) supply air to an upper aerobic fermentation region and to a lower aerobic fermentation region, and ducts (22) remove gaseous and liquid products from a middle anaerobic fermentation region.

The fermentation products are removed by a sweeping worm (29) and sucked by a fan (43) through a separator (33) in which heavy particles fall out (through 40) but lighter ones are retained by the suction. The product is triturated (44) and may be dried (45, 46) and made into briquettes (51) for use as fuel.

14 Claims, 4 Drawing Figures

METHOD AND INSTALLATION FOR PURIFYING CONTAMINATING WATER

This invention relates to a method of purifying contaminating waste, that is to say, waste which, if disposed of in an untreated state, would comtaminate or pollute the environment. The invention also relates to an installation for working the method.

More particularly the invention relates to a method and installation for purifying contaminating waste by using an organic biological filter adapted to purify the waste and simultaneouly to convert the filter substrate or mass into a combustible final product made from the filter mass and contaminating waste after purification.

Purification systems known hitherto can be grouped in two classes: (a) those which only physically separate the components forming the product to be purified and (b) those in which the separation is accompanied by a biological process for converting the product to be purified.

The first class includes all filter systems in which the filter substrate is unchanged and for example comprises a porous material such as sand, and physical separating systems such as electrostatic separators.

The second class includes systems for purifying waste water comprising a fermentation process and a phase of separation by decantation which may if required be combined with a filtration phase. The residue in the decantation phase is a sludge which has hitherto been very difficult to eliminate.

In all the aforementioned cases the process, irrespective of its nature, is limited to the processing of the product to be purified to obtain the solid, liquid and gaseous components thereof, which are of no practical use. At most, in some cases where waste water is purified, the product is a sludge or mud which can be used as a fertilizer after drying.

On the other hand, as a result of the high cost of assembling and maintaining conventional purification plants, they often remain unused even after being assembled. The result is a deterioration in the environment, since waste is dumped without any purifying treatment.

Accordingly, one aspect of the present invention provides a method of purifying gaseous or liquid or pasty waste, the method comprising the steps of: conveying the waste through a biological filter comprising a filter substrate based on material of organic origin and in various stages of accelerated fermentation, the fermentation being caused by micro-organisms of at least one species resistant to the waste to be treated and capable of decomposing the waste and the filter substrate into harmless solid or gaseous or liquid products, the filter substrate comprising first, second and third fermentation regions, there being aerobic fermentation in the first and third (last) regions and anaerobic fermentation in the intermediate second region; controlling the fermentation by introducing an oxygen-containing gas into the first and third regions and extracting at least one gas and at least one liquid from the second region so as to maintain the extent of each region and to maintain the temperature and moisture conditions within limits suitable for the process; and extracting decomposed material and harmless solids from the third fermentation region and introducing new filter material to the first fermentation region so that the filter substrate material is renewed by progressive conveyance through the fermentation regions, the renewal rate being such as to ensure complete decomposition of the waste and to maintain survival conditions for the micro-organisms in the three fermentation steps in the filter substrate.

A second aspect of the invention provides an installation for purifying waste, the installation comprising: a tank containing a filter substrate divided into three fermentation regions, the first and third fermentation regions being aerobic and the second fermentation region being anaerobic, the bottom of the tank being open; a supply means for loading the tank with filter substrate and with waste to be treated; a means for extracting harmless solid products resulting from fermentation within the tank; at least one tube open to the exterior of the tank at the top thereof and extending centrally and downwardly through the tank to terminate adjacent the base, the or at least one of the said tubes being adapted to supply air to the inside of the tank; a plurality of ducts each open to the exterior of the tank at the top thereof and each extending downwardly within the tank to a selected location, at least one of the ducts opening to an aerobic fermentation region and being adapted to supply air to the said region and at least one of the ducts passing into, and being open to, the anaerobic region and being adapted to allow discharge of gases, vapors, and liquids from the said region; an extraction means for extracting harmless products of fermentation, the extraction means comprising a substantially horizontal first worm disposed below the open bottom end of the tank, the worm being adapted to move the products towards the center of the bottom of the tank, where there is a discharge orifice, the worm being adapted to rotate about an upright axis passing through the orifice, the or each said tube opening immediately above the orifice; a duct system for pneumatic extraction by suction extending from the bottom of the orifice away from the tank and adapted to convey the product discharged by the first worm, the duct system comprising a separator, having a chamber communicating with the pneumatic extraction duct system, the chamber containing a second worm adapted to be driven by a motor, the chamber opening into a box having a downwardly-sloping bottom wall and an opening at or adjacent the bottom wall and a closure valve for the opening, the closure valve being adjustable to vary the amount of air entering the opening as a result of the suction in the pneumatic extraction duct system, the second worm being adapted to agitate the products which have fallen from the duct system and to move them to the box, the arrangement being such that air may be sucked through the opening in the box with sufficient force to retain less heavy particles of the said products within the duct system but with insufficient force to entrain the heavier particles, which fall out of the opening in the box.

Methods in accordance with the invention have been found to be useful not only for purifying contaminating waste but also for obtaining a useful solid product which itself, owing to its high value as a fuel, ensures that the installation is profitable.

The contaminating waste to be purified can be gaseous, for example from industry, or liquid, for example urine from pig or cattle livestock farms or the like, or pasty, for example sludge from waste water purifying stations.

The material forming the filter substrate can consist of vegetable waste, for example timber or forest waste, or refuse or mixtures of refuse and timber waste. As a result, methods in accordance with the invention have been found to be extremely valuable in making use of and eliminating refuse from built-up areas, which elimination is a major problem at present. In such cases a method in accordance with the invention can be applied for the sole purpose of eliminating the aforementioned refuse, and additionally provides an end product of use as a fuel.

The various fermentation steps are brought about in the filter substrate by cultures of micro-organisms such as bacteria and fungi, which, of course, must be resistant to the medium in which they are to live and must also be capable of bringing about decomposition and purification of the aforementioned waste and filter material. Preferably the conversion products are either solid products of use as fuel, or harmless liquid products which can be eliminated in liquid or gaseous form, or gaseous products which are combustible or non-combustible. To this end the micro-organisms must be previously cultivated to become adapted to the medium in which they are to live. Once the micro-organisms have been made resistant to a given kind of contaminating waste, the conditions are ready for processing and purifying the waste.

After a time, the strains used in a method in accordance with the invention for a given kind of contaminating waste may degenerate and become unsuitable for proper operation of the filter. In that case the inoculating substance will have to be renewed.

The oxygenation, moisture and temperature conditions in each fermentation region are so controlled as to maintain approximately constant limits between the three regions and bring about the aforementioned fermentation in each step.

In the first and third regions, atmospheric air is introduced to bring about aerobic fermentation, whereas in the second region gases and liquid are extracted, all the aforementioned operations helping to maintain the temperatures.

The first and third fermentation regions can also act as filters for the gases and liquid which may be produced in the second region, so that they can be separated if necessary without unpleasant odours.

The gases extracted directly from the second fermentation region, which may produce unpleasant odours, contain high percentages of combustible gases and may therefore be conveyed to a chamber for burning or for use after they have been suitably treated.

The material forming the filter substrate is constantly renewed by progressively conveying it from the first to the second and thence to the third fermentation region, after which the converted material is extracted at the end of the third region together with the purified waste. During this operation, new filter material is introduced at the beginning of the first fermentation region, resulting in a continuous process. At the same time as the filter substrate is renewed, contaminating waste for purification is added, and can be introduced in the first fermentation region or in the second region.

The rate at which the filter substrate and the waste for purification are added will preferably be such as to ensure total decomposition of the waste and maintenance of survival conditions for the bacteria and/or fungi in the three fermentation regions.

Gas outlets and direct communications to the atmosphere can be provided to maintain adequate oxygenation conditions in the first and third fermentation regions.

Of course, intermediate transition regions exist between the three fermentation regions. In the intermediate regions the conditions vary progressively within the values corresponding to the two adjacent regions.

The liquid products from the second fermentation region are extracted partly in vapour form together with the gases produced in that region and partly in liquid form by gravity or suction.

The three fermentation regions can be adjacent one another or separate, depending on the conditions of the ambient medium, the characteristics of the waste to be purified, the nature of the filter substrate, and the desired purification rate, etc.

Thus, the three fermentation regions can be together in a single tank, in which the first and third fermentation regions occupy respective end regions of the tank whereas the second region occupies the central part thereof. Preferably the three regions will be vertically distributed, the first region being on top and the third region at the bottom.

In this manner the filter substrate and purified waste can be extracted by gravity, new material for the filter substrate being added at the top of the tank whereas the waste for purification is added at the appropriate step. When for example gases are being purified they can be introduced to the second fermentation region, so that the first and third regions act as filters for purifying the gases travelling through them, so that the gases are odourless when discharged. If the waste to be purified is liquid or pasty, it can be mixed with the substrate material added at the top of the first fermentation region, or can be introduced to the second region.

Alternatively the three fermentation steps can be performed in separate tanks. The first, aerobic, fermentation step will occur in a first tank after which the filter mass will be conveyed to a second tank where anaerobic fermentation occurs and will then travel to a third tank for the third, aerobic, fermentation step. Addition of waste, extraction of gases and liquids, control of fermentation conditions etc. will be brought about in the manner previously described. That is to say the material comprising the filter substrate forms heaps of suitable height where air can be admitted to the aerobic fermentation steps and gases can be discharged from the anaerobic fermentation region by tubes inserted into the heaps at appropriate depths.

Finally, the first fermentation step and the beginning of the second step can occur in the open air, the filter substrate and waste for purifying being subsequently conveyed to a tank where the remainder of the second and all of the third fermentation steps are completed. If required the three fermentation steps can be performed in the open air.

In accordance with another feature of the invention, the various fermentation steps or at least part of them can be followed by removal of foreign bodies such as stones or metal or glass objects accompanying the material forming the filter substrate or included in the waste to be purified. It is very advantageous to remove the aforementioned bodies after the three fermentation steps or part thereof, particularly when the filter substrate is totally or partly made up of refuse, since under these conditions the material forming the filter substrate has been substantially disintegrated into small particles or can easily be disintegrated with reduced consumption of energy, so that the non-disintegrated objects can be separated by screening or owing to the difference in density, as will be explained hereinafter.

After the filter substrate and contaminating residue have completed the various fermentation steps and the foreign bodies have been separated, the product is triturated, an operation which is facilitated by the state of the product, which easily disintegrates as a result of fermentation.

The triturated product has been found to constitute an excellent fuel which, after being dried to reduce its moisture content, can be shaped into briquettes for use as a fuel.

Alternatively, before being formed into briquettes, the triturated dried product can be converted into a finely-divided powder which may advantageously be used as an injectable fuel.

So that the invention may be more easily understood and so that further features may be appreciated, a method and installation in accordance with the invention will now be described by way of example and with reference to the accompanying drawings, in which.

Figure 1:
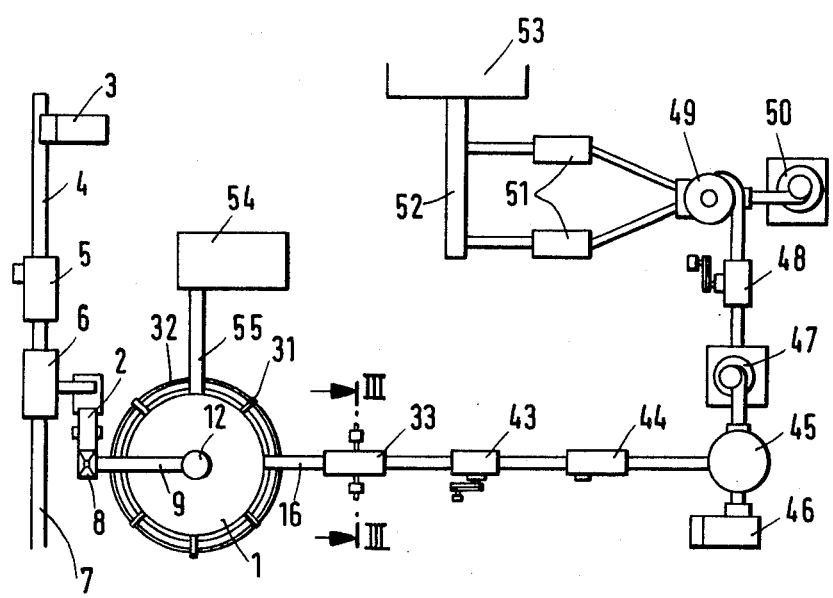
FIG. 1 is a diagrammatic plan view of one embodiment of a installation in accordance with the invention.

For an account of the fermentation processes that occur in the installation illustrated in the drawings, reference should be made to the preceding part of this specification.

The installation shown in the drawings is designed so that the three fermentation steps referred to above occur in a single tank.

As shown in FIG. 1, the installation comprises an axially vertical cylindrical tank 1 in which the three fermentation steps or stages occur. The organic material constituting the filter substrate is supplied by a bucket elevator 2 or by any other elevating system. The organic material comes from a storage region and is poured into a proportioning device 3 from which a conveyor belt 4 extends and is adapted to supply a first crusher 5. The proportioning device 3 regulates the amount of material reaching the crusher 5 to prevent clogging thereof. The crusher 5 is adapted to achieve coarse pulverizing of the material in order to break up large objects. If, for example, the organic material comes partly or totally from refuse, the crusher will be used to break up bags of refuse or boxes or bottles or the like.

After leaving the crusher 5, the product travels to a screen or separator 6 for the sole purpose of eliminating large objects made of plastics, metal, glass or the like. The eliminated objects are discharged via a discard pipe 7 whereas the rest of the product is poured onto the bucket elevator 2. The elevator opens into a feed chamber 8, from which the material travels via a supply duct system 9 into the cylindrical tank 1.

Figure 2:
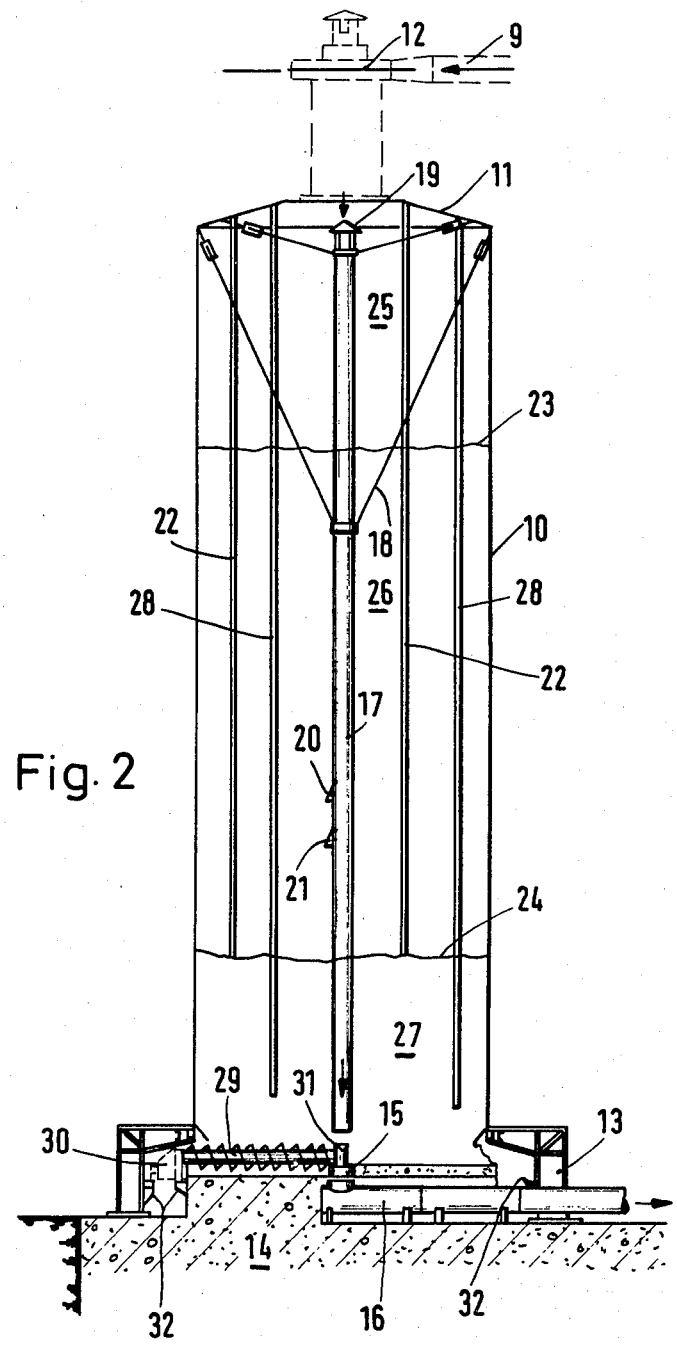
FIG. 2 is a vertical section of a fermentation tank forming part of the installation of FIG. 1.

The tank 1, as shown more clearly in FIG. 2, comprises a cylindrical wall 10 which comprises, or is internally covered by, a material which is not attacked or damaged by fermentation, and also comprises a top closing cover 11. The bottom end of the tank is open. The top cover 11 bears a material-receiving system in the form of an inlet cyclone 12, to which the supply duct system 9 extends. The tank 1 is mounted on external supporting brackets or feet 13. A base 14, made for example of concrete or iron, is disposed under the tank and is slightly separated from the free bottom edge of the tank wall 10. A discharge orifice 15 is formed in the central part of the base 14 and a pneumatic extraction duct system 16 extends therefrom and projects radially to the exterior.

A central vertical tube 17, suspended by tension members 18, is mounted inside the tank and extends from adjacent a point above the highest level reached by the filter substrate downwardly to a point above the discharge orifice 15. The top end of the central tube 17 has a hood 19 which prevents material entering the central tube 17 from the cyclone 12. When the gases can be used, vertical extraction ducts 22 are provided which open via the top cover 11 and extend from the region 26 of the tank 1 corresponding to the anaerobic fermentation stage so that the gases or vapours can be removed through radial orifices in that region.

The extraction ducts 22 can be closed at the bottom ends to receive liquids produced by the anaerobic fermentation, and these liquids can be periodically extracted from the ducts 22 by suction. Alternatively, or as well, some of the extraction ducts 22 can have respective downwardly-inclined prolongations which open through the side of the tank and can be used for discharging the liquids by gravity.

Vertical air ducts 28 are provided for supplying air or another oxygen-containing gas to the aerobic fermentation regions 25 and 27. These ducts have radial orifics in their walls in these regions 25, 27.

The air ducts 28 and extraction ducts 22 may be used to control the oxygenation and temperature conditions of the various regions.

As previously stated, transition regions exist between the three fermentation steps. To simplify the description, however, we shall show the three regions where the aforementioned steps occur as separated by lines 23 and 24, the top region 25 corresponding to the first, aerobic, fermentation step, the intermediate region 26 corresponding to the second, anaerobic, fermentation step and the bottom region 27 corresponding to the third, aerobic, fermentation step.

A first worm 29 is radially mounted between the base 14 of the tank 1 and the bottom edge of the tank wall 10 and is so designed that the filter mass present at the end of the third fermentation step is conveyed to the central discharge orifice 15. The worm 29 is externally driven by a first motor unit 30 and the inner end of the worm bears on a centrally-located rotary support 31. The motor unit 30 is mounted via wheels or another suitable system on a circular track 32, which is concentric with the axis of the cylindrical tank 1 and disposed between the base 14 and the feet 13 bearing the tank. The motor unit 30 moves along the track 32 so that the worm 29 not only rotates about its own axis but also rotates as a whole about the axis of the tank so that the worm 29 engages the material resulting from the third fermentation step over the entire cross-section of the tank. The driving torque rotating the worm about the tank axis is less than a predetermined value, so that when the worm 29 meets a resistant surface preventing further angular advance through the tank, the worm will only rotate about its own axis and will engage the resistant surface until the resistance falls to a value which again permits an angular advance. This effect can, for example, be obtained by employing suitable wheels to bear the motor unit 30, so that when the resistance encountered by the worm exceeds a certain value the wheels bearing the motor unit slip on the track 32.

The direction of screw rotation of the worm is such that material is moved from the periphery of the tank to the centre.

The internal rotary support 31 of the worm is so disposed that it does not prevent material being discharged through the central orifice 15 by the air stream flowing between the central tube 17 and the pneumatic extraction system 16.

Figure 3:
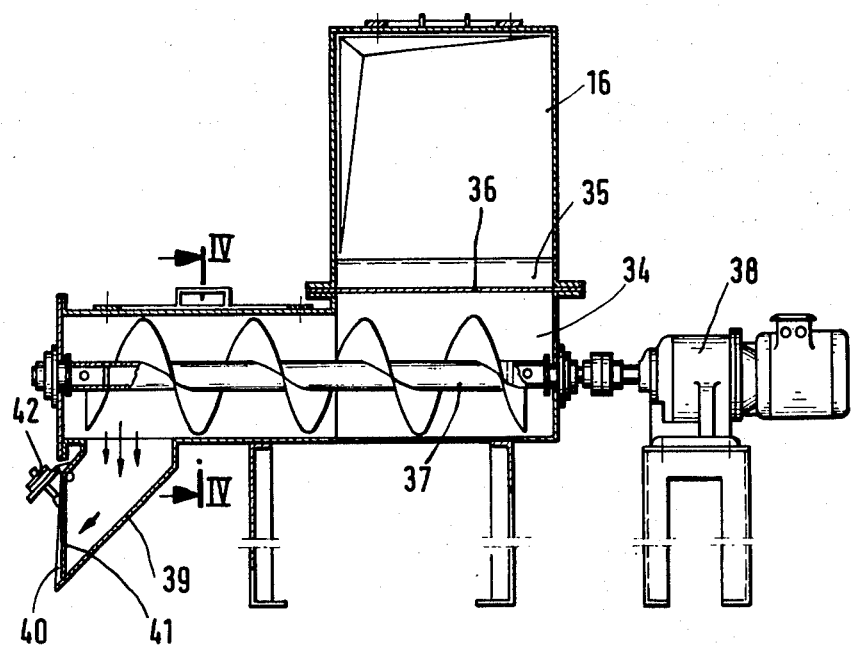
FIG. 3 is a cross-section on an enlarged scale of an extraction duct system taken along line III—III in FIG. 1.
Figure 4:
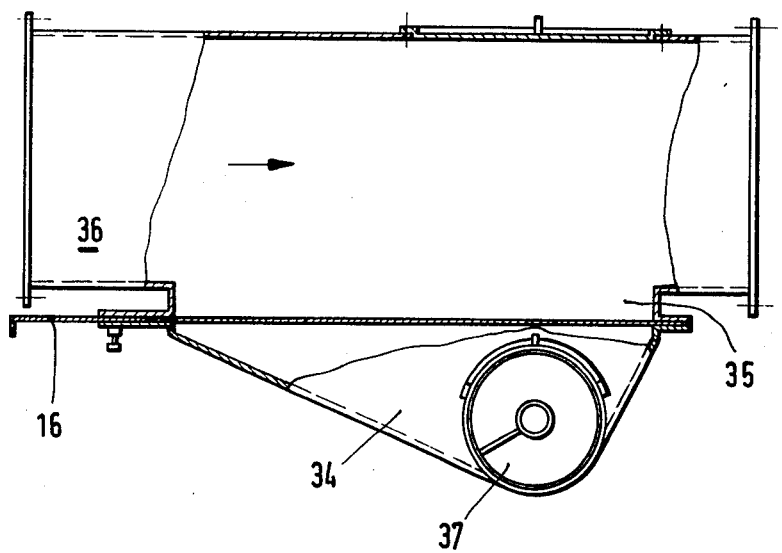
FIG. 4 is a section along line IV—IV in FIG. 3.

A heavy-particle separator 33 is mounted in the pneumatic extraction duct system 6 outside the tank 1 (see FIG. 1) and, as shown in FIGS. 3 and 4, comprises an extraction chamber 34 disposed below the extraction duct system 16 and communicating therewith via an aperture 35, the cross-section of which can be adjusted by an extraction valve 36. A second horizontal worm 37 is mounted in the extraction chamber 34 and extends transversely to the pneumatic duct system 16. The second worm 37 is driven by a second motor unit 38. The extraction chamber 34 opens into a box 39 having an inclined bottom wall and a side opening 40, where a gate 41 in mounted. The gate 41 is adjustable by a suitable mechanism 42.

A fan 43 is located in the pneumatic duct system 16 (See FIG. 1) on the side of the particle separator 33 remote from the fermenation tank 1 and exerts suction within the pneumatic duct system 16. The suction reduces the pressure in the duct system, so that the material moved by the first worm 29 towards the centre of the tank 1 is entrained through the orifice 15. The suction also draws in air via the central tube 17 and the gap in the material produced by the first worm 29 during its operation, so that the resulting stream of air prevents any blockage occurring at the orifice 15. The air flow down through the central tube 17 causes air to enter the fermentation tank via the cyclone 12.

At the same time (referring again to FIGS. 3 and 4) the reduced pressure in the pneumatic duct system 16 causes air to enter through the opening 40 in the box 39, the rate of flow depending on the extent to which the gate 41 is opened.

Once the extraction valve 36 has been opened, the material entrained by the pneumatic duct system 16 falls into the extraction chamber 34. The second worm 37 agitates the material and moves it towards the box 39. The gate 41 is opened to an extent which is adjusted so that the air stream through the opening 40 again entrains the lighter particles back towards the pneumatic duct system 16 for further passage therealong whereas the heavier particles, for example stone, metal objects, glass, etc. fall onto the gate 41 and then fall out when the gate is periodically opened.

All the organic material comprising the filter substrate together with the purified waste will, after passing through the three fermentation steps, have a density lower than that of the particles or objects of mineral or possibly organic nature which occur in the aforementioned organic material and which, owing to their size, have not been converted by fermentation. The separator 33 thus uses the difference in density to eliminate the aforementioned particles or objects.

The separator 33 has been found to provide a simple, reliable method of eliminating heavy objects and particles, e.g. of earth, stone, glass, metal or the like.

Beyond the fan 43, the pneumatic duct system 16 opens into a second crusher 44 for reducing the fermented material to the desired particle size, a triturating operation which is facilitated by the reduced consistency of the particles following fermentation. The triturated material passes continuously through a screen followed by a drying chamber 45 comprising a furnace 46 in which, for example, some of the previously separated waste can be burnt. Note that the moisture content of the material at this stage is greatly reduced, since vapor is eliminated by virtue of the high temperature of the material during the various fermentation steps.

The dried product is subsequently stored in a first silo 47 from which it is extracted by a pneumatic conveyor and fan 48 and sent to an exit cyclone 49, which yields a very fine powder suitable for being injected into a combustion chamber. The powder is stored in a second silo 50. A product having a larger particle size is also obtained and is conveyed to a briquetting installation 51 for forming the product into compact easily-manipulated solid blocks which constitute an excellent fuel for many applications. The blocks are conveyed from the outlet of the briquetting installation by a belt 52 to a storage region 53.

Of course, the installation may also comprise silos at places where it is convenient to provide storage facilities. There can also be two parallel fermentation tanks 1 controlled by the same loading and extraction facilities.

A drum 54 containing contaminated waste for treatment is disposed near the fermentation tank 1 and the waste is conveyed to the tank 1 by a tube system 55. If the waste is introduced during the first fermentation step it can be mixed with the material forming the filter substrate at the inlet cyclone 12 of the tank 1, if required, before the substrate enters the tank. If the residues have to be supplied at the next fermentation step, the required duct systems for supplying the waste will be disposed appropriately. Some of the vertical extraction ducts (FIG. 2) can be used for this purpose. Some or all of the vertical extraction ducts 22 can have a downward extension through the tank wall 10, so that the liquids produced in the anaerobic fermentation region 26 can be discharged by gravity. Alternatively the ducts 22 can be closed at the bottom end to collect the liquids, which are subsequently extracted by suction.

It has been found possible in accordance with the invention to provide a method and installation for purifying contaminating waste by means of which the liquid products, after being purified, are efficiently eliminated in liquid or vapour form without producing any unpleasant odours or contamination.

It has also been found possible to obtain a method of purifying contaminating waste so as to produce useful combustible gases.

I claim:
1. A method of purifying gaseous or liquid or pasty waste, the method comprising the steps of: conveying the waste through a biological filter comprising a filter substrate including solids based on material of organic origin and in various stages of accelerated fermentation, the fermentation being caused by micro-organisms of at least one species resistant to the waste to be treated and capable of decomposing the waste and the filter substrate into harmless solid, gaseous, and liquid products; the filter substrate comprising vertically arranged first, second and third fermentation regions; there being aerobic fermentation in the first and third regions and anaerobic fermentation in the second region; the second region is located between the first and third regions; controlling the fermentation by introducing an oxygen-containing gas into the first and third regions and extracting at least one gas and at least one liquids from the second region so as to maintain the extent of each region and to maintain the temperature and moisture conditions within limits suitable for the process; and extracting decomposed material and harmless solids from the third fermentation region and introducing new filter material to the first fermentation region so that the filter substrate material is renewed by progressive conveyance through the fermentation regions, the renewal rate being such as to ensure complete decomposition of the waste and to maintain survival conditions for the microorganisms in the three fermentation steps in the filter substrate.

2. A method according to claim 1, wherein a portion of the waste to be treated is introduced to the second fermentation regions.

3. A method according to claim 1, comprising the further step of directly introducing air from the atmosphere to the first and third fermentation regions.

4. A method according to claim 1, wherein the gas extracted from the second fermentation region is conveyed to a combustion chamber or processed for subsequent combustion.

5. A method according to claim 1, wherein the liquid extracted from the second fermentation region is extracted partly in the form of vapor together with the gas or gases coming from the second region and the residual liquid is removed by gravity or suction.

6. A method according to claim 1, wherein respective intermediate transition regions exist between the first and second fermentation regions and between the second and third fermentation regions and the conditions within each transition region are progressively varied from the values corresponding to one of the adjacent fermentation regions to the values corresponding to the other fermentation region.

7. A method according to claim 1, wherein the three fermentation regions are located in a single tank in which the first and third fermentation regions are adjacent respective end regions of the tank and the second region is the central part thereof.

8. A method according to claim 1, wherein at least the first fermentation region is open to the atmosphere.

9. A method according to claim 8, wherein the first fermentation and the beginning of the second fermentation are performed in the open air.

10. An installation for purifying waste, the installation comprising: a tank containing a filter substrate divided into three vertically arranged fermentation regions; a first and third fermentation regions being aerobic and a second fermentation region located between the first and third regions being anaerobic; the bottom of the tank being open; a supply means for loading the tank with filter substrate and with waste to be treated; a means for extracting harmless solid products resulting from fermentation within the tank; at least one tube open to the exterior of the tank at the top thereof and extending centrally and downwardly through the tank to terminate adjacent the base, at least one of the said tubes being adapted to supply air to the inside of the tank; a plurality of ducts each open to the exterior of the tank at the top thereof and each extending downwardly within the tank to a selected location, at least one of the ducts opening to said aerobic fermentation regions and being adapted to supply air to the said regions; at least one of the ducts passing into the anaerobic region and being adapted to allow discharge of gases, vapors, and liquids from the said region; an extraction means for extracting harmless products of fermentation; the extracting means comprising a substantially horizontal first worm disposed below the open bottom end of the tank, the worm being adapted to move the products towards the center of the bottom of the tank where there is a discharge orifice, and the worm being adapted to rotate about an upright axis passing through the orifice; each said tubes opening immediately above the orifice; a duct system for pneumatic extraction by suction extending from the bottom of the orifice away from the tank and adapted to convey the product discharged by the first worm; the duct system comprising a separator having a chamber communicating with the duct system, the chamber containing a second worm adapted to be driven by a motor, the chamber opening into a box having a downwardly-sloping bottom wall and an opening at or adjacent the bottom wall, a closure valve for the opening, the closure valve being adjustable to vary the amount of air entering the opening as a result of the suction in the duct system, the second worm being adapted to agitate the products which have fallen from the duct system and to move them to the box, and the arrangement being such that air may be sucked through the opening in the box with sufficient force to retain less heavy particles of the said products within the duct system but with insufficient force to entrain the heavier particles which fall out of the opening of the box.

11. An installation according to claim 10, wherein the tank is supported by external brackets which are disposed around the tank and are separated therefrom by a sufficient amount to allow the first worm to rotate as said.

12. An installation according to claim 10 or 11 wherein the inner end of the first worm bears on a rotary support mounted on a central part of the discharge orifice and situated between the orifice and the opening of each said tube, the outer end of the first worm is connected to an actuating mechanism comprising a motor and being adapted to screw the worm and to rotate the worm, and the torque producing the said rotation being less than a predetermined value so that when resistance to the rotation exceeds a certain limit the worm ceases to rotate and screws only.

13. An installation according to claim 12 wherein the said worm actuating mechanism is disposed outside the base on a rolling means above a track surrounding the base, the mechanism being adapted to move along the track carrying the first worm.

14. An installation according to claim 10 wherein at least some of the said ducts which pass into the anaerobic fermentation region have a respective downwardly extending prolongation opening laterally through the tank wall for discharging liquid products by gravity or suction.

* * * * *